United States Patent
Kuo

(10) Patent No.: US 10,634,826 B2
(45) Date of Patent: Apr. 28, 2020

(54) IMAGE CAPTURING DEVICE

(71) Applicant: Sercomm Corporation, Taipei (TW)

(72) Inventor: Chih-Sheng Kuo, Taipei (TW)

(73) Assignee: Sercomm Corporation, Taipei (TW)

( * ) Notice: Subject to any disclaimer, the term of this patent is extended or adjusted under 35 U.S.C. 154(b) by 411 days.

(21) Appl. No.: 15/455,139

(22) Filed: Mar. 10, 2017

(65) Prior Publication Data
US 2017/0329056 A1    Nov. 16, 2017

Related U.S. Application Data

(60) Provisional application No. 62/333,852, filed on May 10, 2016.

(30) Foreign Application Priority Data

Dec. 20, 2016   (CN) .................... 2016 2 1399444 U

(51) Int. Cl.
*G02B 5/00*      (2006.01)
*H04N 5/33*      (2006.01)
*H04N 5/225*     (2006.01)

(52) U.S. Cl.
CPC ........... *G02B 5/003* (2013.01); *H04N 5/2256* (2013.01)

(58) Field of Classification Search
CPC .............................. G02B 5/003; H04N 5/2256
USPC ........................................................ 348/164
See application file for complete search history.

(56) References Cited

U.S. PATENT DOCUMENTS

| | | | | |
|---|---|---|---|---|
| 5,845,162 A | * | 12/1998 | Hicks | G03B 17/24 396/318 |
| 6,380,871 B1 | * | 4/2002 | Kaplan | G01S 17/10 340/555 |
| 8,497,479 B1 | | 7/2013 | Garman et al. | |
| 2012/0212805 A1 | | 8/2012 | Koide et al. | |
| 2013/0001728 A1 | * | 1/2013 | De Amicis | H01L 27/14623 257/435 |
| 2013/0169805 A1 | | 7/2013 | Park | |
| 2015/0277000 A1 | | 10/2015 | Lee | |

* cited by examiner

*Primary Examiner* — Matthew K Kwan
(74) *Attorney, Agent, or Firm* — JCIPRNET

(57) ABSTRACT

An image capturing device includes a main body, at least one light source, a lens, and at least one first light shielding structure. The light source disposed at the main body is suitable for providing a light beam to an outside of the main body. The lens disposed at the main body is suitable for capturing a light entering the lens from the outside of the main body. The first light shielding structure is disposed at the main body. The light beam turns into an actual output light beam after being shielded by the first light shielding structure. The first light shielding structure shields the light beam in a vertical direction more than it shields the light beam in a horizontal direction, so an actual vertical light emitting angle of the actual output light beam is smaller than an actual horizontal light emitting angle of the actual output light beam.

10 Claims, 2 Drawing Sheets

IMAGE CAPTURING DEVICE

CROSS-REFERENCE TO RELATED APPLICATION

This application claims the priority benefits of U.S. provisional application Ser. No. 62/333,852, filed on May 10, 2016 and Chinese application serial no. 201621399444.8, filed on Dec. 20, 2016. The entirety of each of the above-mentioned patent applications is hereby incorporated by reference herein and made a part of this specification.

BACKGROUND OF THE INVENTION

Field of the Invention

The invention relates to an optical device and particularly related to an image capturing device.

Description of Related Art

As image capturing techniques advance, image capturing devices are widely used in various internet protocol cameras (IP cameras), such as doorbell cameras and dome cameras. IP cameras have been widely used in various places and in various security monitoring applications. To maintain the function of image capturing at night or in the absence of external light sources, an IP camera is generally equipped with an infrared light source. However, when the IP camera is placed on a desktop or installed at a ceiling, a part of the light beam emitted by the infrared light source may be unexpectedly reflected to the lens by the desktop or the ceiling and as a result interfere with image capturing. Yet most of the current solutions are complex or even require additional structural components to alter the installation angle of the infrared light source. As a result, manufacturing cost of the IP camera is increased.

SUMMARY OF THE INVENTION

The invention provides an image capturing device to enhance image capturing quality and reduce manufacturing cost.

The image capturing device of the invention includes a main body, at least one light source, a lens, and at least one first light shielding structure. The at least one light source is disposed at the main body and is suitable for providing a light beam to an outside of the main body. The lens is disposed at the main body and is suitable for capturing a light, wherein the light enters the lens from the outside of the main body. The at least one first light shielding structure is disposed at the main body, wherein the light beam turns into an actual output light beam after being partially shielded by the at least one first light shielding structure, and the at least one first light shielding structure shields the light beam in a vertical direction more than in a horizontal direction, so that an actual vertical light emitting angle of the actual output light beam in the vertical direction is smaller than an actual horizontal light emitting angle of the actual output light beam in the horizontal direction.

Based on the above, in the image capturing device of this invention, a part of the light beam emitted by the light source is shielded in the vertical direction by using the light shielding structures, so as to reduce the vertical light emitting angle of the light beam. Accordingly, when the image capturing device is placed on a desktop or installed at a ceiling, the light beam emitted by the light source is prevented from being unexpectedly reflected to the lens by the desktop or the ceiling so as to interfere with image capturing. As a result, image capturing quality of the image capturing device is enhanced. Because the vertical light emitting angle of the light beam, as described above, is reduced by using the light shielding structures to shield the light beam and not by altering the installation angle of the light source, it is not necessary to perform a complex design for the installation angle of the light source, and it is not necessary to add additional structural components to alter the installation angle. As a result, manufacturing cost of the image capturing device is reduced.

To make the aforementioned and other features and advantages of the invention more comprehensible, several embodiments accompanied with drawings are described in detail as follows.

BRIEF DESCRIPTION OF THE DRAWINGS

The accompanying drawings are included to provide a further understanding of the invention, and are incorporated in and constitute a part of this specification. The drawings illustrate exemplary embodiments of the invention and, together with the description, serve to explain the principles of the invention.

DESCRIPTION OF THE EMBODIMENTS

Figure 1:
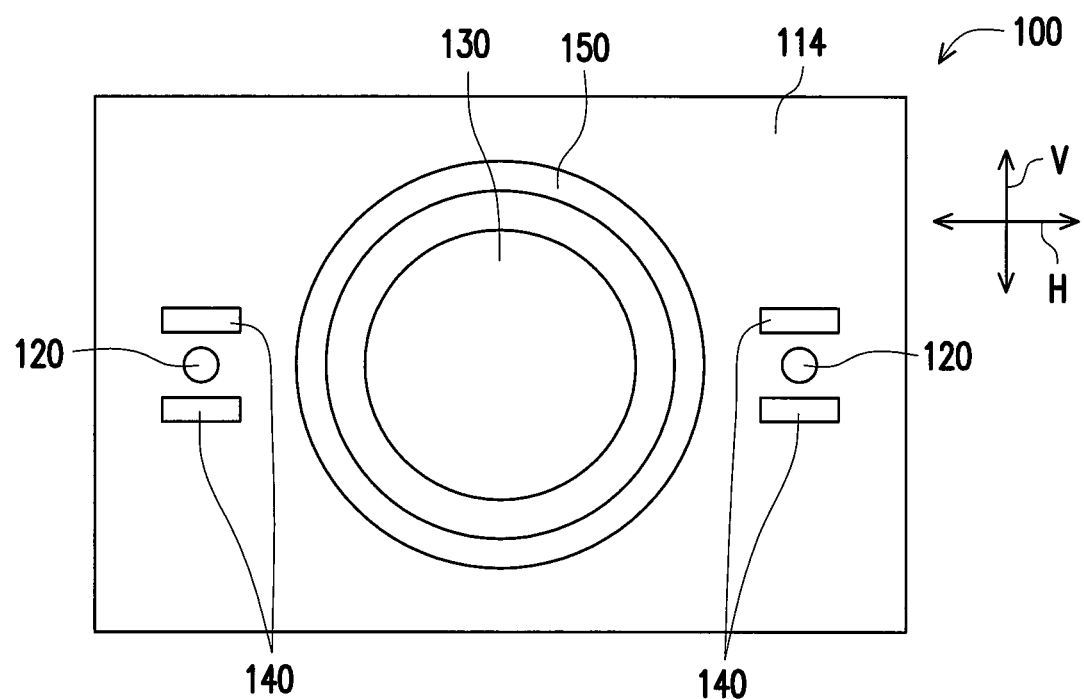
FIG. 1 is a schematic front view of an image capturing device according to an embodiment of the invention.
Figure 2:
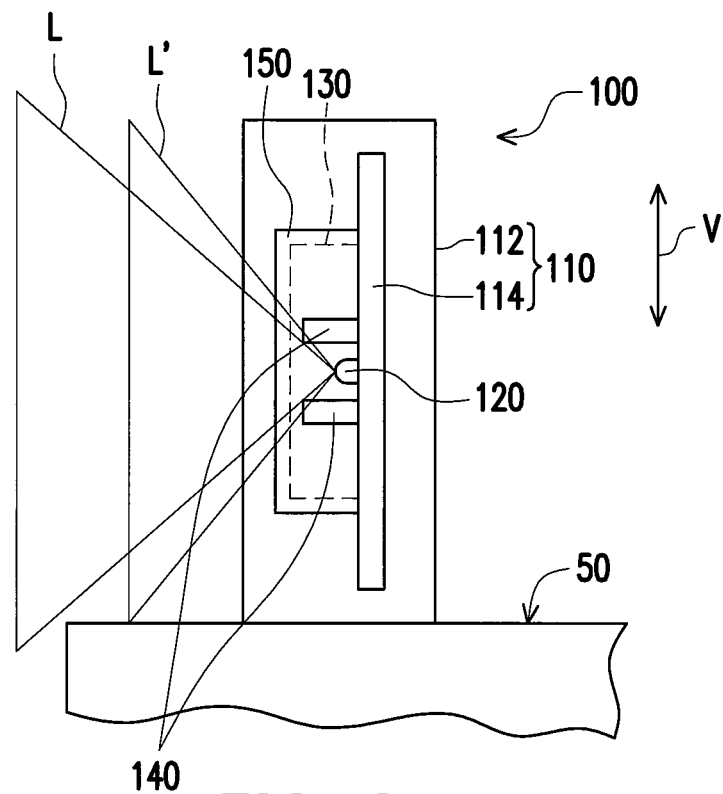
FIG. 2 is a side view of a part of components of the image capturing device of FIG. 1.

FIG. 1 is a schematic front view of an image capturing device according to an embodiment of the invention. FIG. 2 is a side view of a part of components of the image capturing device of FIG. 1. Referring to FIG. 1 and FIG. 2, a light capturing device 100 of the embodiment is, for example, an IP camera and includes a main body 110, two light sources 120, a lens 130, and a plurality of first light shielding structures 140. The main body 110 includes an outer casing 112 and a circuit board 114. The circuit board 114 is disposed inside the outer casing 112, and each of the light sources 120 is, for example, an infrared light source and is disposed on the circuit board 114 of the main body 110. The lens 130 and the first light shielding structures 140 are also disposed on the circuit board 114 of the main body 110. The two light sources 120 are respectively located at a right side and a left side of the lens 130, so that one light source 120, the lens 130 and the other light source 120 are sequentially arranged along a horizontal direction H. Two of the first light shielding structures 140 correspond to one light source 120, and another two of the first light shielding structures 140 correspond to another light source 120.

Figure 3:
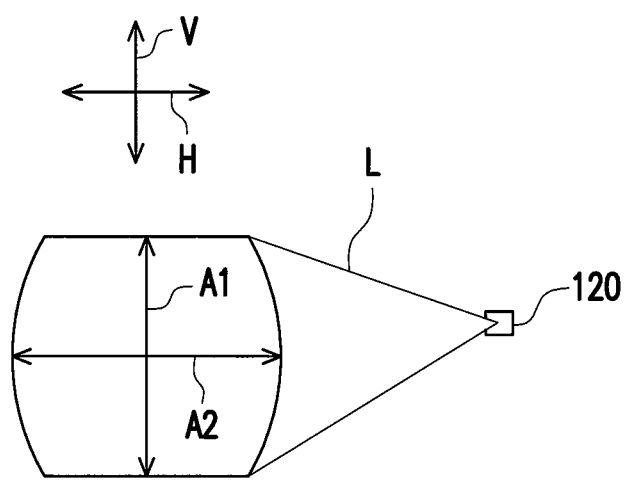
FIG. 3 is a schematic perspective view of a light source and a light beam of FIG. 2.

FIG. 3 is a schematic perspective view of a light source and a light beam of FIG. 2. Referring to FIG. 1 and FIG. 3, each of the light sources 120 is suitable for providing a light beam L' to the outside of the outer casing 112 of the main body 110. However, because of partial shielding caused by the first light shielding structures 140, what is actually provided to outside the outer casing 112 of the main body 110 is an actual output light beam L. Please note that optical effects such as refraction and reflection caused by the outer casing 112 when the actual output light beam L passes through the front side of the outer casing 112 is neglected here to make the explanation easier to understand. The light beam L' has a vertical light emitting angle A1' (not shown) in a vertical direction V and a horizontal light emitting angle A2' (not shown) in the horizontal direction H. When there is no shielding in the horizontal direction, the actual output light beam L has an actual horizontal light emitting angle A2 that is equal to A2'. The lens 130 is suitable for capturing a light that enters the lens 130 from the outside of the main body 110. The light beam L' turns into an actual output light beam L after being partially shielded by the first light shielding structure 140. Each of the first light shielding structures 140 is aligned to the corresponding light source 120 along the vertical direction V and shields a part of the light L', so that each of the first light shielding structures 140 shields the light beam L' in the vertical direction V more than in the horizontal direction H. As a result, an actual vertical light emitting angle A1 of the actual output light beam L in the vertical direction V is smaller than the actual horizontal light emitting angle A2 of the actual output light beam L in the horizontal direction H. That is to say, the image capturing device 100 shields the light beam L' in the vertical direction V more than in the horizontal direction H. As a result, the vertical light emitting angle A1' (not shown) of the light beam L' is reduced to the actual vertical light emitting angle A1 of the actual output light beam L, and the actual vertical light emitting angle A1 is smaller than the actual horizontal light emitting angle A2 of the actual output light beam L. In other embodiments, the first light shielding structures 140 may be formed on the outer casing 112 or other structures and are aligned to the light sources 120 in other similar manners; the invention is not limited thereto.

If the light beam L' emitted by the light source 120 is not partially shielded by the first light shielding structures 140, in a configuration scenario such as FIG. 2, a part of the light beam L' will be reflected to the lens 130 by a desktop 50 to interfere with image capturing. By employing the first light shielding structures 140 to shield a part of the light beam L' emitted by the light source 120 in the vertical direction V for reducing the vertical light emitting angle A1' of the light beam L' to the actual vertical light emitting angle A1, the light beam L' emitted by the light source 120 is prevented from being unexpectedly reflected to the lens 130 by the desktop 50. As a result, image capturing quality of the image capturing device 100 is enhanced. In addition, because in this embodiment the vertical light emitting angle A1' of the light beam L', as described above, is reduced by using the first light shielding structures 140 to shield the light beam L' and not by altering an installation angle of the light source 120, it is not necessary to perform a complex design for the installation angle of the light source 120, and it is not necessary to add additional structural components to alter the installation angle of the light source. As a result, manufacturing cost of the image capturing device 100 is reduced.

In this embodiment, a length of the first light shielding structures 140 along a light emitting direction of the light source 120 is larger than a length of the light source 120 along the abovementioned light emitting direction, so that the first light shielding structures 140 are able to effectively reduce the vertical light emitting angle A1' of the light beam L'. In other words, in FIG. 2 the length of the first light shielding structures 140 that extends toward the left is larger than the length of the light source 120 that extends toward the left. Specifically, the first light shielding structures 140 may be designed to be of an adequate size so that a difference between the actual vertical light emitting angle A1 of the light beam L and the actual horizontal light emitting angle A2 of the light beam L is larger than or equal to 20 degrees. In other embodiments, the difference between the actual vertical light emitting angle A1 and the horizontal light emitting angle A2 may be designed to be other adequate angle values.

In this embodiment, each of the light sources 120 is aligned to the lens 130 along the horizontal direction H as shown in FIG. 1. And by designing the first light shielding structures 140s to be of an adequate size, the actual vertical light emitting angle A1 of the actual output light beam L becomes equal to or less than a field of view (FOV) of the image capturing device 100 in the vertical direction V.

As shown in FIG. 1 and FIG. 2, two of the first light shielding structures 140 are respectively located at a top side of the light source 120 and a bottom side of the light source 120, so that one first light shielding structure 140, the light source 120 and the other first light shielding structure 140 are sequentially arranged along the vertical direction V. However, the invention is not limited thereto. The first light shielding structure 140 may also be disposed only at the top side of the light source 120 or only at the bottom side of the light source 120. In addition, in this embodiment, a material of the first light shielding structures 140 is, for example, black rubber or black sponge. In other embodiments, the material of the first light shielding structures 140 may be other adequate light absorbing materials. The invention is not limited thereto.

In this embodiment, the image capturing device 100 further includes a second light shielding structure 150. The second light shielding structure 150 is disposed on the circuit board 114 or the outer casing 112 of the main body 110 and surrounds the lens 130, so as to prevent a part of the actual output light beam L emitted by the light source 120 from reflecting to the lens 130 inside the outer case 112 to interfere with image capturing. In some other embodiments, the second light shielding structure 150 may be omitted. As shown in FIG. 1, in this embodiment, the first light shielding structures 140 and the second light shielding structure 150 are separated from each other rather than integrally formed. However, it is also possible to design them to be integrally formed. Specific details are given below accompanied with a drawing.

Figure 4:
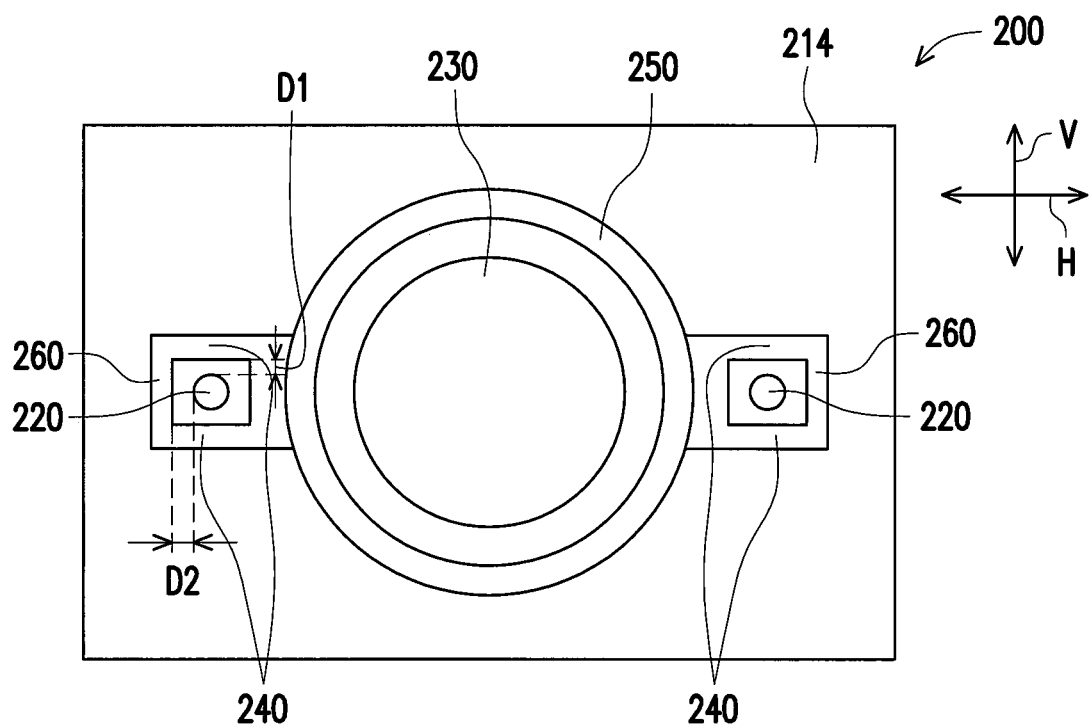
FIG. 4 is a front view of a part of components of the image capturing device according to another embodiment of the invention.

FIG. 4 is a front view of a part of components of the image capturing device according to another embodiment of the invention. In FIG. 4, a circuit board 214, light sources 220, a lens 230, first light shielding structures 240, and a second light shielding structure 250 in an image capturing device 200 are similar to the circuit board 114, the light sources 120, the lens 130, the first light shielding structures 140, and the second light shielding structure 150 in FIG. 1 in terms of configurations and functions, and repeated description of the same technical contents is omitted here. The difference between the image capturing device 200 and the image capturing device 100 is that the first light shielding structures 240 and the second light shielding structure 250 are connected with each other to become an integrally formed structure.

In addition, the image capturing device 200 further includes two third light shielding structures 260. Each of the third light shielding structures 260 is disposed on the circuit board 214 of a main body and is aligned to the corresponding light source 220 along a horizontal direction H. The first light shielding structures 240 and the third light shielding structures 260 are also connected with each other to become an integrally formed structure. Furthermore, a distance D1 between the first light shielding structure 240 and the light source 220 along a vertical direction V is shorter than a distance D2 between the third light shielding structure 260 and the light source 220 along the horizontal direction H, so that a vertical light emitting angle of the light source 220 is reduced more by shielding caused by the first light shielding structures 240. In some other embodiments, the third light shielding structures 260 may be omitted.

In summary of the above, in the image capturing device of this invention, a part of the light beam emitted by the light source is shielded in the vertical direction by using the light shielding structures, so as to reduce the vertical light emitting angle of the light beam. Accordingly, when the image capturing device is placed on a desktop or installed at a ceiling, a part of the light beam emitted by the light source is prevented from being unexpectedly reflected to the lens by the desktop or the ceiling so as to interfere with image capturing. As a result, image capturing quality of the image capturing device is enhanced. Because the vertical light emitting angle of the light beam, as described above, is reduced by using the light shielding structures to shield the light beam and not by altering the installation angle of the light source, it is not necessary to perform a complex design for the installation angle of the light source, and it is not necessary to add additional structural components to alter the installation angle. As a result, manufacturing cost of the image capturing device is reduced.

Although the embodiments are already disclosed as above, these embodiments should not be construed as limitations on the scope of the invention. It will be apparent to those ordinarily skilled in the art that various modifications and variations can be made to the disclosed embodiments without departing from the scope or spirit of this invention. In view of the foregoing, it is intended that the invention covers modifications and variations provided that they fall within the scope of the following claims and their equivalents.

What is claimed is:

1. An image capturing device, comprising:
    a main body;
    at least one light source disposed at the main body and suitable for providing a light beam to an outside of the main body;
    a lens disposed at the main body and suitable for capturing a light, wherein the light enters the lens from the outside of the main body; and
    at least one first light shielding structure disposed at the main body, wherein the light beam turns into an actual output light beam after being partially shielded by the at least one first light shielding structure, and the at least one first light shielding structure shields the light beam in a vertical direction more than in a horizontal direction, so that an actual vertical light emitting angle of the actual output light beam in the vertical direction is smaller than an actual horizontal light emitting angle of the actual output light beam in the horizontal direction,
    wherein the number of the at least one first light shielding structure is two, the two first light shielding structures are respectively located at a top side of the at least one light source and a bottom side of the at least one light source, so that one of the first light shielding structures, the at least one light source, and the other one of the first light shielding structures are sequentially arranged along the vertical direction, and the first light shielding structures are disposed beside the lens in the horizontal direction.

2. The image capturing device according to claim 1, wherein a difference between the actual vertical light emitting angle and the actual horizontal light emitting angle is larger than or equal to 20 degrees.

3. The image capturing device according to claim 1, wherein the at least one light source is aligned to the lens along the horizontal direction, and the actual vertical light emitting angle is equal to or less than a field of view of the image capturing device in the vertical direction.

4. The image capturing device according to claim 1, wherein the number of the at least one light source is two, and the two light sources are respectively located at a right side of the lens and a left side of the lens, so that one of the light sources, the lens, and the other one of the light sources are sequentially arranged along the horizontal direction.

5. The image capturing device according to claim 1, further comprising a second light shielding structure, wherein the second light shielding structure is disposed at the main body and surrounds the lens, and the at least one first light shielding structure and the second light shielding structure are integrally formed.

6. The image capturing device according to claim 1, further comprising at least one third light shielding structure, wherein the at least one third light shielding structure is disposed at the main body and is aligned to the at least one light source along the horizontal direction, and the at least one first light shielding structure and the at least one third light shielding structure are integrally formed.

7. The image capturing device according to claim 6, wherein a distance between the at least one first light shielding structure and the at least one light source along the vertical direction is shorter than a distance between the at least one third light shielding structure and the at least one light source along the horizontal direction.

8. The image capturing device according to claim 1, wherein the image capturing device is an internet protocol camera and the at least one light source is an infrared light source.

9. The image capturing device according to claim 1, wherein a length of the at least one first light shielding structure along a light emitting direction of the at least one light source is greater than a length of the at least one light source along the light emitting direction.

10. The image capturing device according to claim 1, wherein the image capturing device shields the light beam in the vertical direction more than the image capturing device shields the light beam in the horizontal direction.

* * * * *